US012621546B2

(12) United States Patent
Vilermo et al.

(10) Patent No.: US 12,621,546 B2
(45) **Date of Patent: *May 5, 2026**

(54) ROTATING CAMERA AND MICROPHONE CONFIGURATIONS

(71) Applicant: Nokia Technologies Oy, Espoo (FI)

(72) Inventors: Miikka Tapani Vilermo, Siuro (FI); Antero Tossavainen, Helsinki (FI); Ari Juhani Koski, Lempaala (FI); Matti Sakari Hamalainen, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 125 days.

This patent is subject to a terminal disclaimer.

(21) Appl. No.: 17/940,472

(22) Filed: Sep. 8, 2022

(65) Prior Publication Data

US 2023/0007147 A1 Jan. 5, 2023

Related U.S. Application Data

(63) Continuation of application No. 17/121,925, filed on Dec. 15, 2020, now Pat. No. 11,483,454.

(30) Foreign Application Priority Data

Dec. 20, 2019 (GB) ...................................... 1919060

(51) Int. Cl.
*H04N 23/50* (2023.01)
*H04R 5/04* (2006.01)
*G03B 17/56* (2021.01)

(52) U.S. Cl.
CPC ............... *H04N 23/50* (2023.01); *H04R 5/04* (2013.01); *G03B 17/561* (2013.01)

(58) Field of Classification Search
CPC ...... H04N 23/50; H04N 23/61; H04N 23/695; H04N 7/185; H04R 5/04; H04R 2430/20;
(Continued)

(56) References Cited

U.S. PATENT DOCUMENTS

2005/0140810 A1 6/2005 Ozawa
2006/0269073 A1* 11/2006 Mao ..................... H04R 29/005
381/56
(Continued)

FOREIGN PATENT DOCUMENTS

EP 3 416 408 A1 12/2018
GB 2519172 A 4/2015
(Continued)

*Primary Examiner* — Loi H Tran
(74) *Attorney, Agent, or Firm* — McCarter & English, LLP

(57) ABSTRACT

An apparatus comprising a first part, the first part having: at least one camera configured to capture images, and at least two microphones configured to capture at least two audio signals; and a second part having at least one microphone configured to capture at least one audio signal, wherein one of the first part or the second part is configured to perform a move relative to the other part, wherein the apparatus is configured to: determine a parameter associated with the move; select at least one of: the at least two audio signals, or the at least one audio signal based, at least partially, on the determined parameter; and generate at least one output audio signal based on the parameter associated with the move and the selected at least one of: the at least two audio signals or, the at least one audio signal.

20 Claims, 13 Drawing Sheets

112

(58) Field of Classification Search
CPC .... H04R 1/406; H04R 2499/11; H04R 3/005;
G03B 17/561; H04S 3/008; H04S 7/303;
H04S 2400/01; H04S 2400/11; H04S
2400/15
USPC ........................................................ 386/224
See application file for complete search history.

(56)                References Cited

U.S. PATENT DOCUMENTS

| | | | |
|---|---|---|---|
| 2013/0044884 A1 | 2/2013 | Tammi et al. | |
| 2013/0259243 A1* | 10/2013 | Herre ...................... | G10L 19/02 |
| | | | 381/57 |
| 2015/0189436 A1 | 7/2015 | Kelloniemi | |
| 2015/0237455 A1 | 8/2015 | Mitra et al. | |
| 2016/0277863 A1 | 9/2016 | Cahill et al. | |
| 2018/0262857 A1* | 9/2018 | Okuma .................. | H04R 3/005 |
| 2019/0349677 A1* | 11/2019 | Mate ...................... | G10L 25/48 |
| 2021/0337338 A1* | 10/2021 | Vilkamo ................. | H04S 7/302 |

FOREIGN PATENT DOCUMENTS

| | | |
|---|---|---|
| WO | WO-2013/083875 | 6/2013 |
| WO | WO-2014/053875 A1 | 4/2014 |
| WO | WO 2018/060549 A1 | 4/2018 |

* cited by examiner

803

807

Camera 805

MIC1 effective
location when
camera part open
819

MIC1 effective
location when
camera part closed
821

MIC2 effective location
814

MIC1 817

807

MIC2
815

827

801

ROTATING CAMERA AND MICROPHONE CONFIGURATIONS

RELATED APPLICATION

This application is a continuation of U.S. patent application Ser. No. 17/121, 925, filed Dec. 15, 2020, which is hereby incorporated by reference in its entirety, and claims priority to GB 1919060.2 filed Dec. 20, 2019.

FIELD

The present application relates to apparatus and methods for rotating camera and microphone configurations, but not exclusively for rotating camera and microphone configurations within spatial audio capture apparatus.

BACKGROUND

Spatial audio capture is a rapidly developing field of investigation. Conventionally a capture device has a microphone configuration which is fixed relative to the camera. In such configurations the spatial relationship between the camera or cameras and the microphones is fixed and aligning the spatial audio signal and video images is a simple operation.

For example spatial audio which has the ability to determine audio directions in a plane can be captured using a device comprising 3 microphones and to determine audio direction in all directions can be captured using a device comprising 4 microphones.

Audio directions can be typically analysed based on level and phase/time differences of microphone signals. The physical configuration affects audio signals coming from different directions differently and different microphone locations cause sound from different directions to arrive at different time to the microphones. The different arrival times TDOA (Time Difference of Arrival) can be used to determine directions using known methods. With the fixed distances and locations of the microphones relative to the camera these directions can be aligned with the camera direction in a simple manner.

There may be in some situations a capture device which has the ability to move or rotate the camera relative to the microphones. In such capture devices there is a need to be able to more efficiently handle the audio signals generated, for example to maintain a 'correct' alignment otherwise the difference between objects in the video images and the audio directions may be distracting for the user of the playback apparatus.

SUMMARY

There is provided according to a first aspect an apparatus comprising: a first part, the first part having at least one camera configured to capture images; a second part having at least one microphone configured to capture at least one audio signal, wherein one of the first part or second part is able to move relative to the other part and the apparatus comprising means configured to: determine a parameter associated with the move; generate at least one output audio signal based on the parameter associated with the move and the at least one audio signal.

The first part or the second part may be able to move relative to common reference point.

The move may be at least one of: a rotation about an axis in common between the first part and the second part; a pitch and/or yaw and/or roll between the first part and the second part; a movement of the first part relative to the second part; and a movement of the second part relative to the first part.

The means may be further configured to: multiplex the at least one output audio signal and the images captured by the camera; and output the multiplexed at least one output audio signal and the images captured by the camera.

The first part may further have at least one further microphone configured to capture at least one further audio signal, wherein the means configured to generate at least one output audio signal based on the parameter associated with the move and the at least one audio signal may be configured to generate the at least one output audio signal further based on the at least one further audio signal.

The means configured to generate the at least one output audio signal further based on the at least one further audio signal may be configured to align the at least one output audio signal and the at least one further audio signal based on the parameter associated with the move.

The at least one microphone may comprise at least three microphones arranged with respect to the second part, and the means configured to generate at least one output audio signal based on the parameter associated with the move and the at least one audio signal may be configured to: obtain a parameter defining the arrangement of the at least three microphones; obtain a parameter defining an orientation of the apparatus; and generate the at least one output audio signal further based on the parameter defining the arrangement of the at least three microphones and the parameter defining an orientation of the apparatus.

The means configured to generate the at least one output audio signal further based on the parameter defining the arrangement of the at least three microphones and the parameter defining an orientation of the apparatus may be configured to generate the at least one output audio signal for at least one frequency band based on the parameter defining the arrangement of the at least three microphones and the parameter defining an orientation of the apparatus.

The means configured to generate at least one output audio signal based on the parameter associated with the move and the at least one audio signal may be configured to align the at least one output audio signal based on the parameter associated with the move such that the at least one output audio signal is aligned with the camera.

The at least one microphone may be configured to receive acoustic waves external of the apparatus via at least one sound port, wherein the at least sound port comprises at least one dimension which may be modified based on at least the first part relative to the second part.

The first part relative to the second part may be an angle of the first part relative to the second part.

The effective location of the at least one microphone may be defined by the at least one dimension which may be modified based on at least the angle of the first part relative to the second part.

The at least one output audio signals may comprises at least one of: at least one spatial audio signal; at least one non-spatial audio signal; a mono audio signal; a beamformed audio signal; and a shotgun audio signal.

The means configured to generate the at least one output audio signal based on the parameter associated with the move and the at least one audio signal may be further configured to analyse the at least one audio signal based on the parameter and a frequency band associated with the at least one audio signal.

The means configured to generate the at least one output audio signal based on the parameter associated with the move and the at least one audio signal may be further configured to analyse the at least one further audio signal based on the parameter and a frequency band associated with the at least one audio signal.

The parameter may comprise a rotation of the first part relative to the second part.

The means configured to generate the at least one output audio signal based on the parameter associated with the move and the at least one audio signal may be further configured to: generate a mono audio signal based on a rotation of the first part relative to the second part and/or an orientation of the apparatus being a first configuration; and generate a spatial audio signal based on a rotation of the first part relative to the second part and/or an orientation of the apparatus being a second configuration.

The means configured to generate the at least one output audio signal based on the parameter associated with the move, the at least one audio signal, and the at least one further audio signal may be further configured to: generate a mono audio signal based on the at least one further audio signal; generate a spatial audio signal based on the at least one audio signal; combine the mono audio signal based on the at least one further audio signal and the spatial audio signal based on the at least one audio signal based on the parameter.

The one of the first part or second part being able to move relative to the other part is configured to reveal the at least one microphone such that the at least one audio signal captured by the at least one microphone signal is a spatial audio signal.

According to a second aspect there is provided a method comprising: providing an apparatus, the apparatus comprising a first part, the first part having at least one camera configured to capture images; a second part having at least one microphone configured to capture at least one audio signal, wherein one of the first part or second part is able to move relative to the other part;
   determining a parameter associated with the move;
   generating at least one output audio signal based on the parameter associated with the move and the at least one audio signal.

The first part or the second part may be able to move relative to common reference point.

The move may be at least one of: a rotation about an axis in common between the first part and the second part; a pitch and/or yaw and/or roll between the first part and the second part; a movement of the first part relative to the second part; and a movement of the second part relative to the first part.

The means may be further configured to: multiplex the at least one output audio signal and the images captured by the camera; and output the multiplexed at least one output audio signal and the images captured by the camera.

The first part may further have at least one further microphone configured to capture at least one further audio signal, wherein generating at least one output audio signal based on the parameter associated with the move and the at least one audio signal may comprise generating the at least one output audio signal further based on the at least one further audio signal.

Generating the at least one output audio signal further based on the at least one further audio signal may comprise aligning the at least one output audio signal and the at least one further audio signal based on the parameter associated with the move.

The at least one microphone comprises at least three microphones arranged with respect to the second part, and generating at least one output audio signal based on the parameter associated with the move and the at least one audio signal may comprise: obtaining a parameter defining the arrangement of the at least three microphones; obtaining a parameter defining an orientation of the apparatus; and generating the at least one output audio signal further based on the parameter defining the arrangement of the at least three microphones and the parameter defining an orientation of the apparatus.

Generating the at least one output audio signal further based on the parameter defining the arrangement of the at least three microphones and the parameter defining an orientation of the apparatus may comprise generating the at least one output audio signal for at least one frequency band based on the parameter defining the arrangement of the at least three microphones and the parameter defining an orientation of the apparatus.

Generating at least one output audio signal based on the parameter associated with the move and the at least one audio signal may comprise aligning the at least one output audio signal based on the parameter associated with the move such that the at least one output audio signal is aligned with the camera.

The method may comprise: receiving, by the at least one microphone, acoustic waves external of the apparatus via at least one sound port.

The method may comprise modifying at least one dimension of the at least sound port based on at least the first part relative to the second part.

The first part relative to the second part may be an angle of the first part relative to the second part.

Modifying at least one dimension of the at least sound port based on at least the first part relative to the second part may modify an effective location of the at least one microphone.

The at least one output audio signal may comprise at least one of: at least one spatial audio signal; at least one non-spatial audio signal; a mono audio signal; a beamformed audio signal; and a shotgun audio signal.

Generating the at least one output audio signal based on the parameter associated with the move and the at least one audio signal may further comprise analysing the at least one audio signal based on the parameter and a frequency band associated with the at least one audio signal.

Generating the at least one output audio signal based on the parameter associated with the move and the at least one audio signal may further comprise analysing the at least one further audio signal based on the parameter and a frequency band associated with the at least one audio signal.

The parameter may comprise a rotation of the first part relative to the second part.

Generating the at least one output audio signal based on the parameter associated with the move and the at least one audio signal may further comprise: generating a mono audio signal based on a rotation of the first part relative to the second part and/or an orientation of the apparatus being a first configuration; and generating a spatial audio signal based on a rotation of the first part relative to the second part and/or an orientation of the apparatus being a second configuration.

Generating the at least one output audio signal based on the parameter associated with the move, the at least one audio signal, and the at least one further audio signal may further comprise: generating a mono audio signal based on the at least one further audio signal; generating a spatial audio signal based on the at least one audio signal; and combining the mono audio signal based on the at least one further audio signal and the spatial audio signal based on the at least one audio signal based on the parameter.

The one of the first part or second part being able to move relative to the other part is configured to reveal the at least one microphone such that the at least one audio signal captured by the at least one microphone signal is a spatial audio signal.

According to a third aspect there is provided an apparatus comprising: a first part, the first part having at least one camera configured to capture images; a second part having at least one microphone configured to capture at least one audio signal, wherein one of the first part or second part is able to move relative to the other part; at least one processor and at least one memory including a computer program code, the at least one memory and the computer program code configured to, with the at least one processor, cause the apparatus at least to: determine a parameter associated with the move; generate at least one output audio signal based on the parameter associated with the move and the at least one audio signal.

The first part or the second part may be able to move relative to common reference point.

The move may be at least one of: a rotation about an axis in common between the first part and the second part; a pitch and/or yaw and/or roll between the first part and the second part; a movement of the first part relative to the second part; and a movement of the second part relative to the first part.

The apparatus may be further caused to: multiplex the at least one output audio signal and the images captured by the camera; and output the multiplexed at least one output audio signal and the images captured by the camera.

The first part may further have at least one further microphone configured to capture at least one further audio signal, wherein the apparatus caused to generate at least one output audio signal based on the parameter associated with the move and the at least one audio signal may be further caused to generate the at least one output audio signal further based on the at least one further audio signal.

The apparatus caused to generate the at least one output audio signal further based on the at least one further audio signal may be caused to align the at least one output audio signal and the at least one further audio signal based on the parameter associated with the move.

The at least one microphone may comprise at least three microphones arranged with respect to the second part, and the apparatus caused to generate at least one output audio signal based on the parameter associated with the move and the at least one audio signal may be caused to: obtain a parameter defining the arrangement of the at least three microphones; obtain a parameter defining an orientation of the apparatus; and generate the at least one output audio signal further based on the parameter defining the arrangement of the at least three microphones and the parameter defining an orientation of the apparatus.

The apparatus caused to generate the at least one output audio signal further based on the parameter defining the arrangement of the at least three microphones and the parameter defining an orientation of the apparatus may be caused to generate the at least one output audio signal for at least one frequency band based on the parameter defining the arrangement of the at least three microphones and the parameter defining an orientation of the apparatus.

The apparatus caused to generate at least one output audio signal based on the parameter associated with the move and the at least one audio signal may be caused to align the at least one output audio signal based on the parameter associated with the move such that the at least one output audio signal is aligned with the camera.

The apparatus may be caused to: receive, by the at least one microphone, acoustic waves external of the apparatus via at least one sound port.

The apparatus may be caused to modify at least one dimension of the at least sound port based on at least the first part relative to the second part.

The first part relative to the second part may be an angle of the first part relative to the second part.

The apparatus caused to modify at least one dimension of the at least sound port based on at least the first part relative to the second part may be caused to modify an effective location of the at least one microphone.

The at least one output audio signal may comprise at least one of: at least one spatial audio signal; at least one non-spatial audio signal; a mono audio signal; a beam-formed audio signal; and a shotgun audio signal.

The apparatus caused to generate the at least one output audio signal based on the parameter associated with the move and the at least one audio signal may be further caused to analyse the at least one audio signal based on the parameter and a frequency band associated with the at least one audio signal.

The apparatus caused to generate the at least one output audio signal based on the parameter associated with the move and the at least one audio signal may be further caused to analyse the at least one further audio signal based on the parameter and a frequency band associated with the at least one audio signal.

The parameter may comprise a rotation of the first part relative to the second part.

The apparatus caused to generate the at least one output audio signal based on the parameter associated with the move and the at least one audio signal may be further caused to: generate a mono audio signal based on a rotation of the first part relative to the second part and/or an orientation of the apparatus being a first configuration; and generate a spatial audio signal based on a rotation of the first part relative to the second part and/or an orientation of the apparatus being a second configuration.

The apparatus caused to generate the at least one output audio signal based on the parameter associated with the move, the at least one audio signal, and the at least one further audio signal may be further caused to: generate a mono audio signal based on the at least one further audio signal; generate a spatial audio signal based on the at least one audio signal; and combine the mono audio signal based on the at least one further audio signal and the spatial audio signal based on the at least one audio signal based on the parameter.

The one of the first part or second part being able to move relative to the other part is configured to reveal the at least one microphone such that the at least one audio signal captured by the at least one microphone signal is a spatial audio signal.

According to a fourth aspect there is provided an apparatus comprising: a first part, the first part having at least one camera configured to capture images; a second part having at least one microphone configured to capture at least one audio signal, wherein one of the first part or second part is able to move relative to the other part; means for determining a parameter associated with the move; means for generating at least one output audio signal based on the parameter associated with the move and the at least one audio signal.

According to a fifth aspect there is provided a computer program comprising instructions [or a computer readable medium comprising program instructions] for causing an apparatus comprising: a first part, the first part having at least one camera configured to capture images; a second part having at least one microphone configured to capture at least one audio signal, wherein one of the first part or second part is able to move relative to the other part, to perform at least the following: determining a parameter associated with the move; generating at least one output audio signal based on the parameter associated with the move and the at least one audio signal.

According to a sixth aspect there is provided a non-transitory computer readable medium comprising program instructions for causing an apparatus comprising: a first part, the first part having at least one camera configured to capture images; a second part having at least one microphone configured to capture at least one audio signal, wherein one of the first part or second part is able to move relative to the other part, to perform at least the following: determining a parameter associated with the move; generating at least one output audio signal based on the parameter associated with the move and the at least one audio signal.

According to a seventh aspect there is provided an apparatus comprising: a first part, the first part having at least one camera configured to capture images; a second part having at least one microphone configured to capture at least one audio signal, wherein one of the first part or second part is able to move relative to the other part, to perform at least the following: circuitry configured to determine a parameter associated with the move; circuitry configured to generate at least one output audio signal based on the parameter associated with the move and the at least one audio signal.

According to an eighth aspect there is provided a computer readable medium comprising program instructions for causing an apparatus comprising: a first part, the first part having at least one camera configured to capture images; a second part having at least one microphone configured to capture at least one audio signal, wherein one of the first part or second part is able to move relative to the other part, to perform at least the following: determining a parameter associated with the move; generating at least one output audio signal based on the parameter associated with the move and the at least one audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

8

Figure 1:
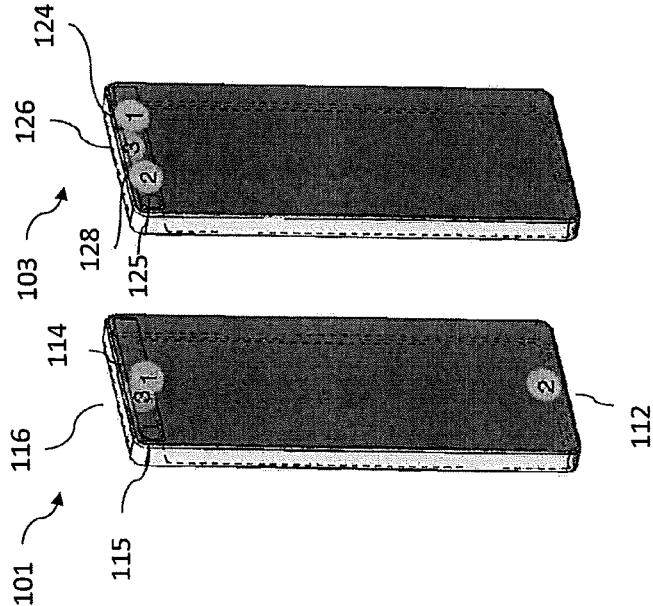
Figure 2:
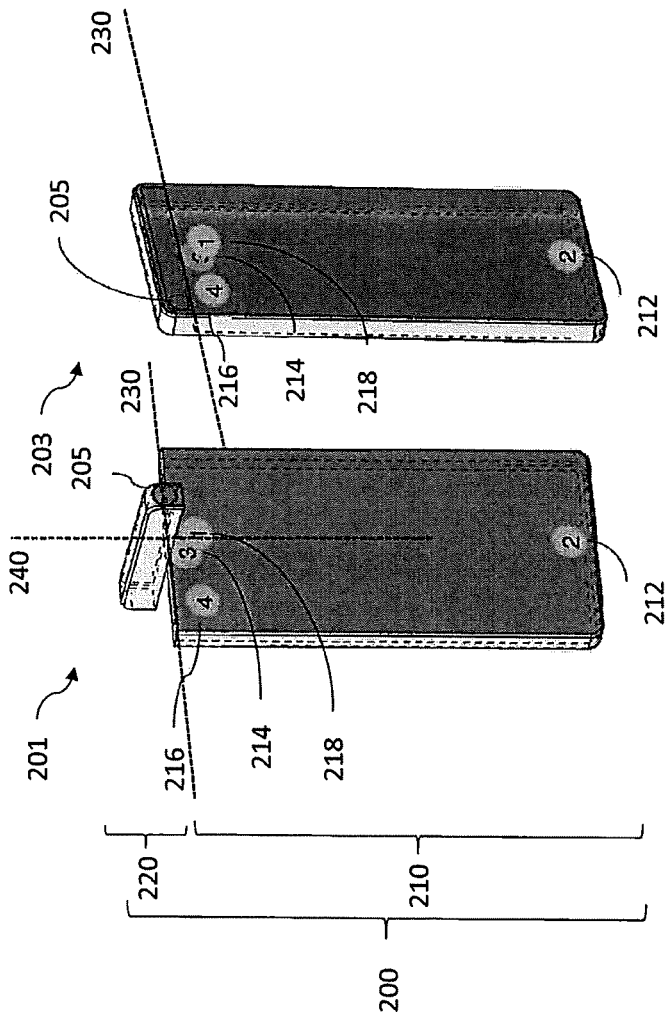
Figure 3:
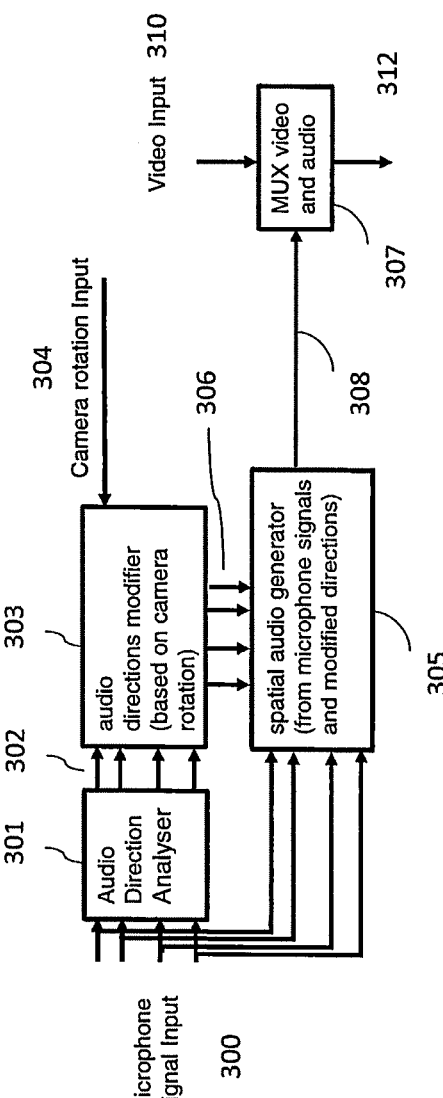
Figure 4:
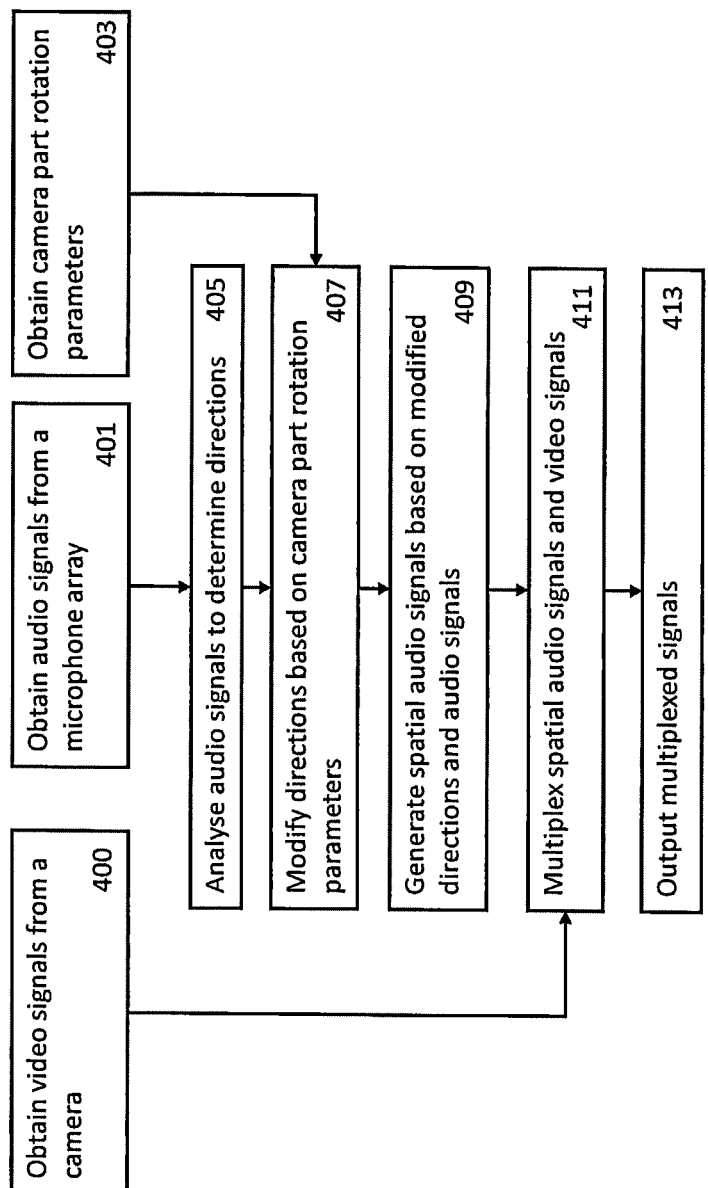
Figure 5:
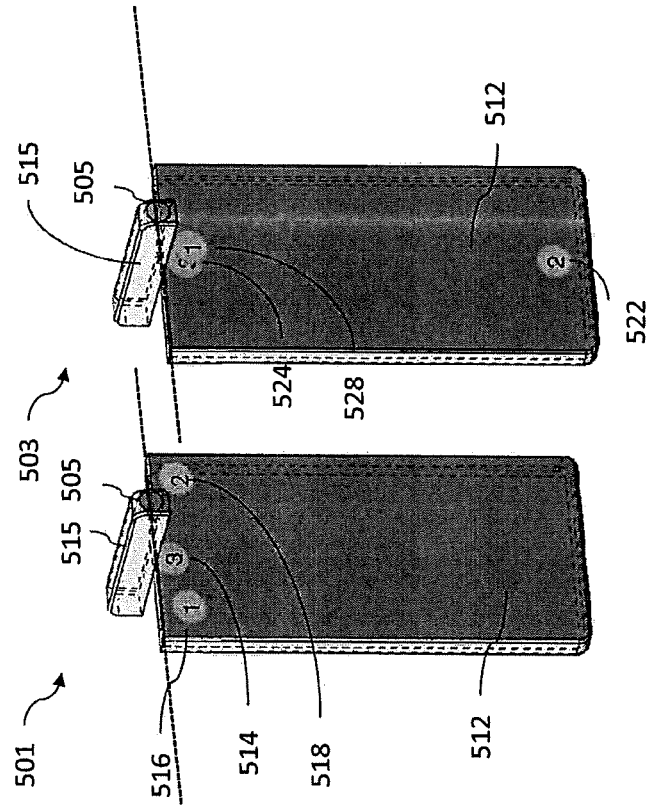
Figure 6:
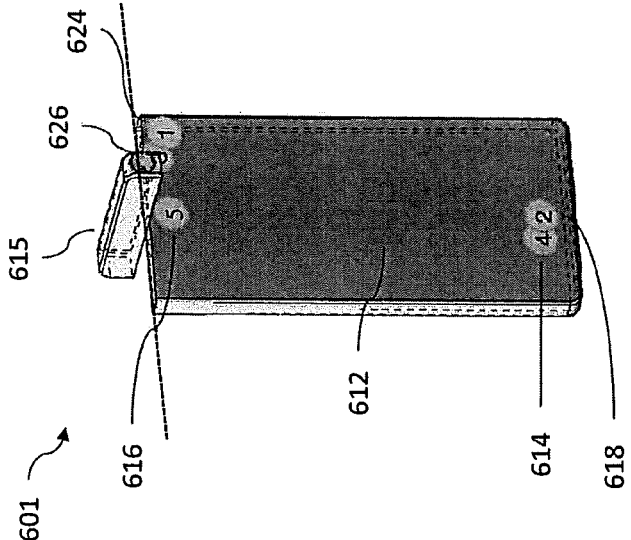
Figure 7:
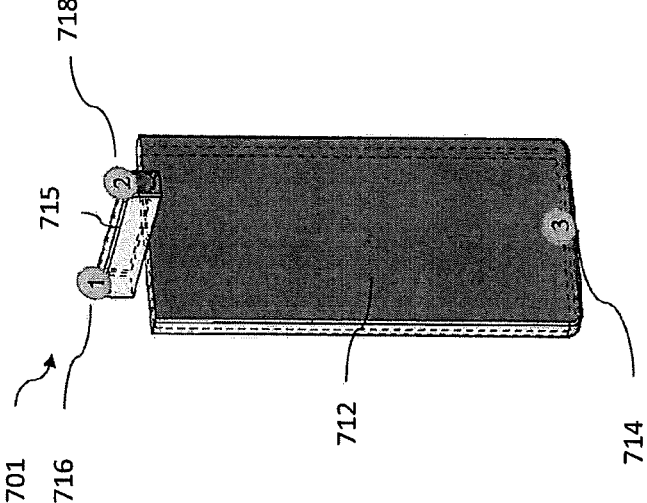
Figure 8:
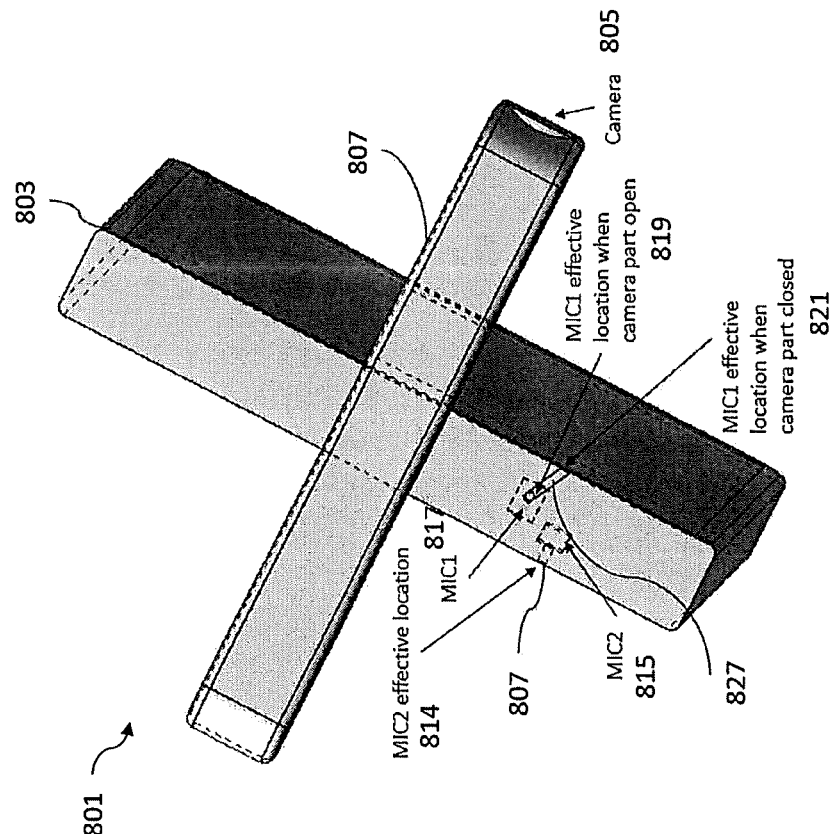
Figure 9:
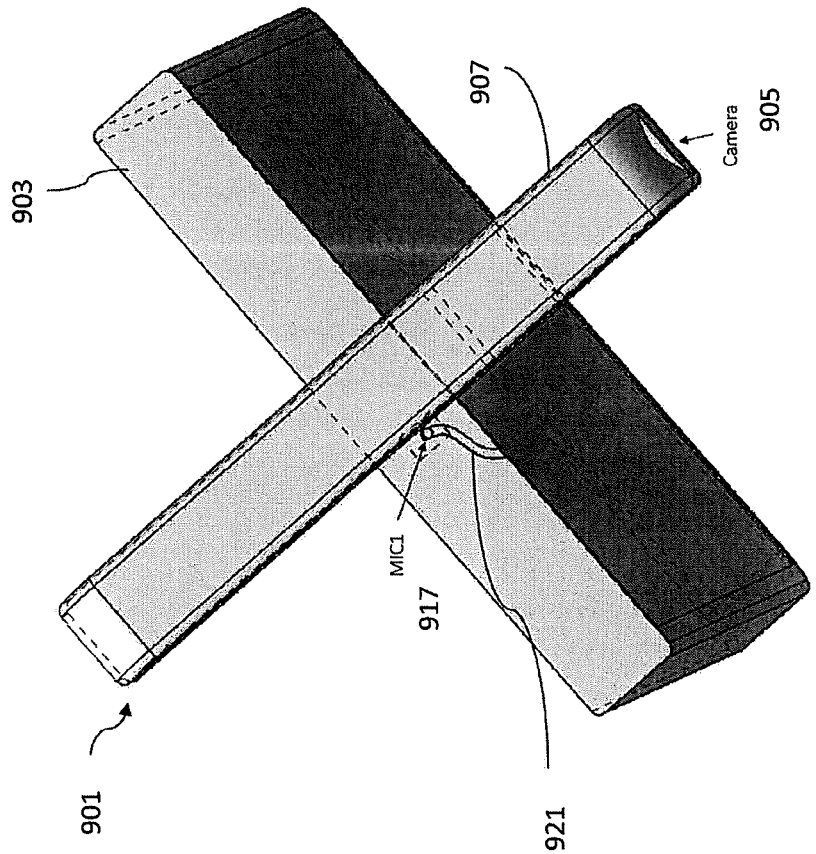
Figure 10:
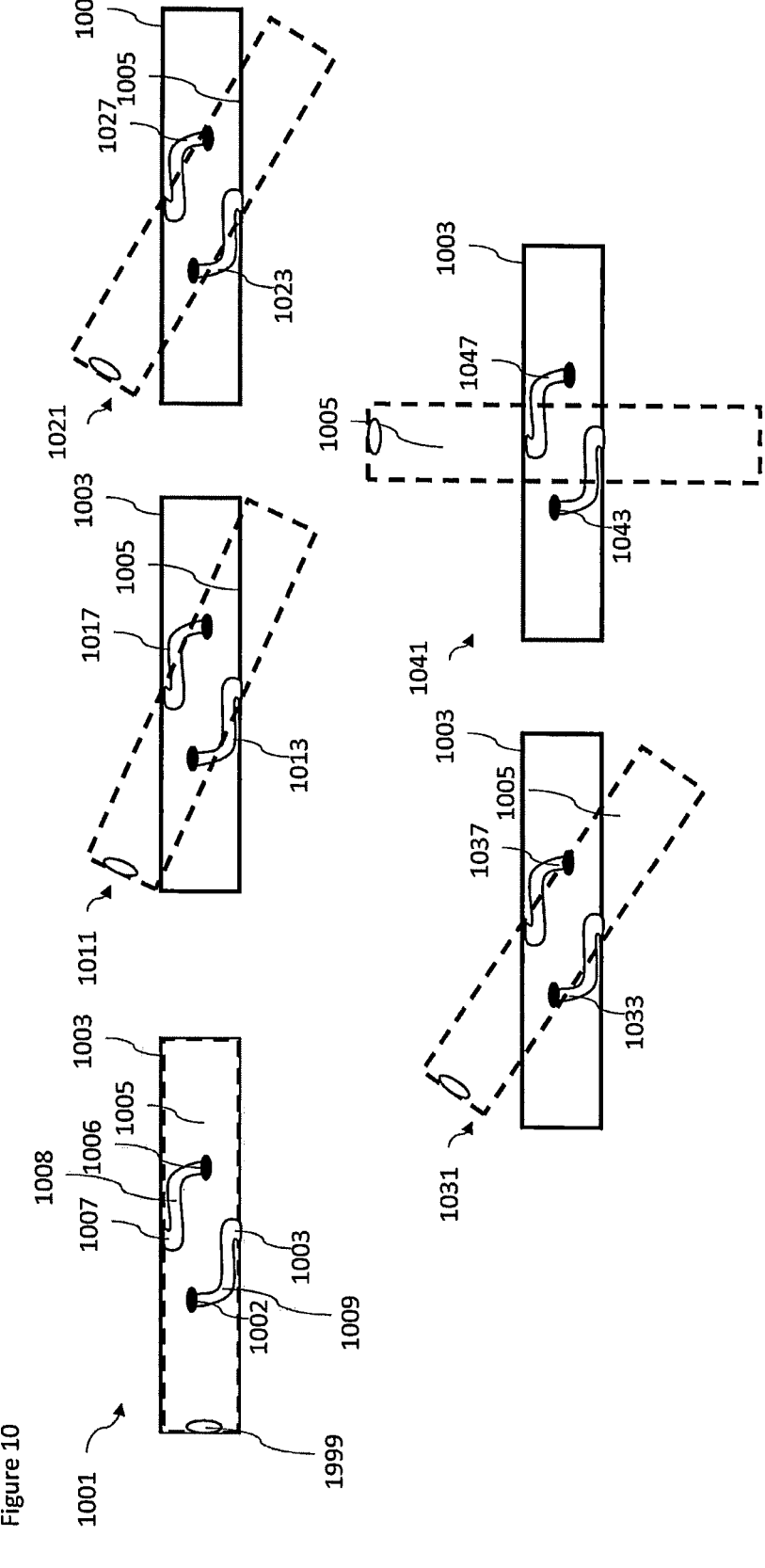
Figure 11:
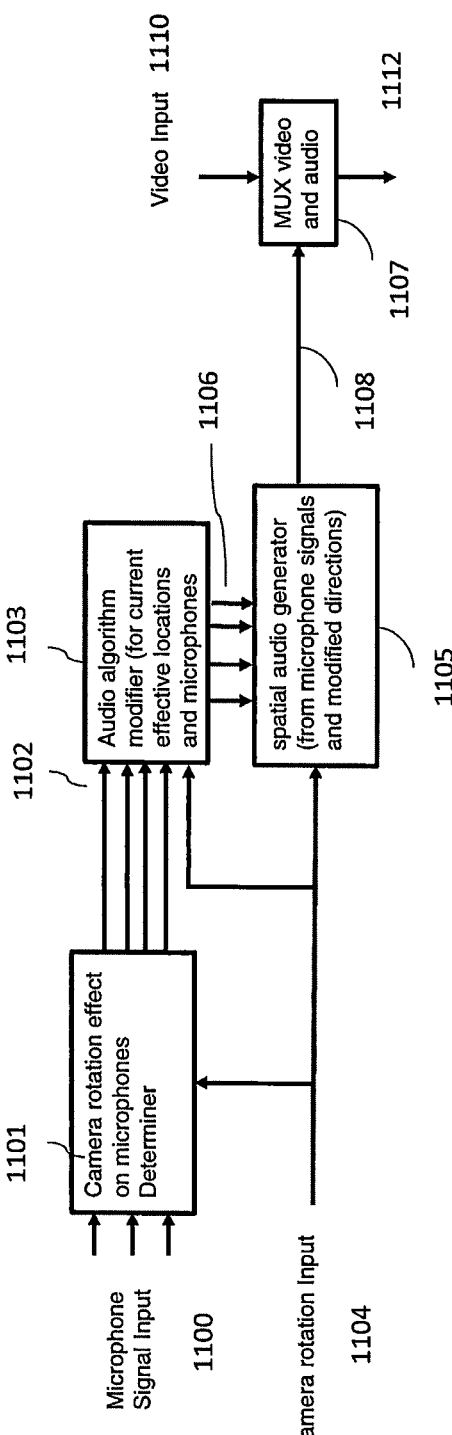
Figure 12:
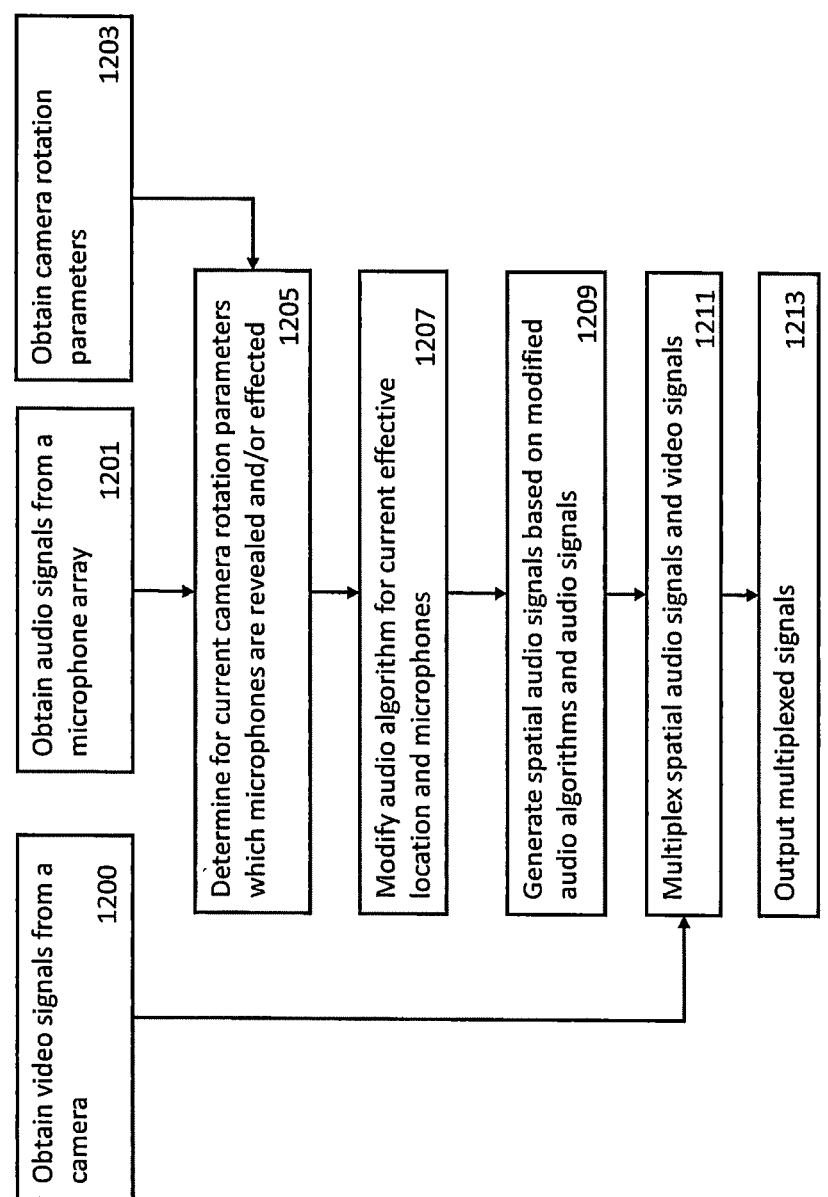
Figure 13:
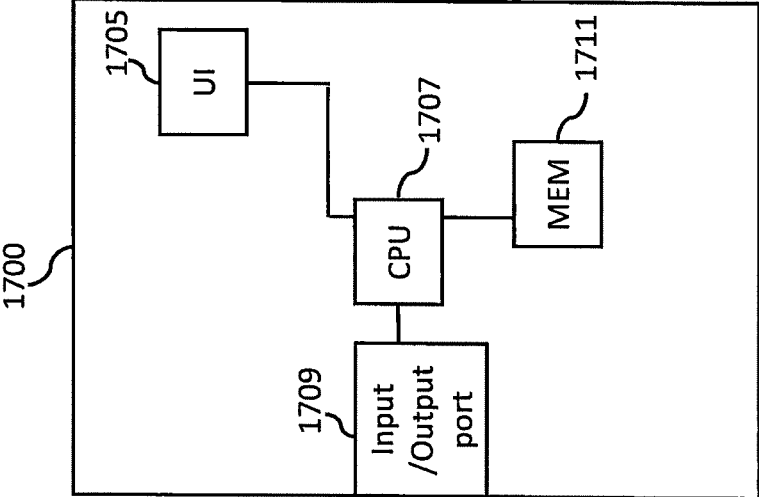

FIG. 1 shows schematically examples of multi-microphone capture apparatus capable of capturing audio signals and images with a fixed camera;

FIG. 2 shows schematically further examples of multi-microphone capture apparatus capable of capturing audio signals and images with a rotatable camera part in two positions according to some embodiments;

FIG. 3 shows schematically a spatial audio system according to some embodiments;

FIG. 4 shows a flow diagram of the operation of the spatial audio system as shown in FIG. 3 according to some embodiments;

FIGS. 5 and 6 show schematically further examples of multi-microphone capture apparatus capable of capturing audio signals and images with a rotatable camera part according to some embodiments;

FIG. 7 shows schematically an example of multi-microphone capture apparatus capable of capturing audio signals and images with a rotatable camera, wherein at least one of the microphones are coaxially mounted with the camera;

FIG. 8 shows example microphone effective locations for example multi-microphone capture apparatus capable of capturing audio signals and images with a rotatable camera capable of changing the effective location;

FIG. 9 shows example microphone effective locations for a further example multi-microphone capture apparatus capable of capturing audio signals and images with a rotatable camera part capable of changing the effective location;

FIG. 10 shows example microphone effective locations for an additional example multi-microphone capture apparatus capable of capturing audio signals and images with a rotatable camera part capable of changing the effective location;

FIG. 11 shows schematically a further spatial audio system according to some embodiments;

FIG. 12 shows a flow diagram of the operation of the spatial audio system as shown in FIG. 11 according to some embodiments; and FIG. 13 shows schematically an example device suitable for implementing the apparatus shown in previous figures.

EMBODIMENTS OF THE APPLICATION

The following describes in further detail suitable apparatus and possible mechanisms for spatial audio signal capture and processing using capture apparatus.

As discussed above a device with a camera that may rotate with respect to the rest of the device (and any microphones located on the device) is one which is not currently well configured with respect to spatial audio capture.

As discussed spatial audio with correct directions in a plane can be captured using 3 microphones and all directions can be captured using 4 microphones. Many different capture and direction analysis algorithms exist.

If a spatial audio signal is accurately captured then the spatial audio signal can be rotated.

Rotating cameras enable many different use cases. Some microphone locations are more optimal for some use cases and different microphone locations are needed for others. Use case examples include:

Teleconferences where the capture device is located on a table and the camera can be configured to turn to an active speaker;

Video recording where the user holds the capture device in their hand; and

Selfie recording where the camera can be configured to be turned towards the user.

Additionally there is further complexity in that the capture device may be operated in either portrait or landscape orientation.

As discussed above spatial audio directions are typically determined based on an analysis of level and phase/time differences of microphone audio signals. The configuration of the physical device defines the directions and the distances of the microphones which affects the captured audio signals. This can therefore sometimes help allowing larger differences to the microphone audio signals where there is a large physical distance between the microphones, but it can also be a hindrance. In some configurations the microphone locations are such that the acoustic waves which are converted into the audio signals may travel around the device using several paths that are close similar but have slightly difference level and phase/time differences. This produces errors in any level and phase/time difference estimations and disturbs direction detection.

An example of designed microphone configurations is shown in FIG. 1. The example capture device 101 on the left hand side of FIG. 1 shows a fixed configuration of a camera 115 mounted at the top left of one face of the device 101. The capture device furthermore comprises 3 microphones, a first microphone 114 located at the top middle of the same face as the camera 115, a second microphone 112 located at the bottom middle of the same face as the camera 115 and a third microphone 116 located at the top middle of the face opposite to the camera 115. This configuration attempts to optimized spatial capture when the device is operated in a landscape orientation because it has 3 microphones in approximately a horizontal plane (when the device is in landscape orientation) that optimizes capture of directions in a horizontal plane which is important for spatial audio.

This configuration is also designed such that the microphones are away from corners where users typically hold the device 101 when operating in landscape orientation.

The example capture device 103 on the right hand side of FIG. 1 shows a fixed configuration of a camera 125 mounted at the same top left of one face of the device 103. The capture device however in this design comprises 3 microphones, a first microphone 124 located at the top mid-right of the same face as the camera 115, a second microphone 112 located at the top mid-left of the same face as the camera 115 and a third microphone 116 located at the top middle of the face opposite to the camera 115. This configuration attempts to optimize spatial audio capture in portrait orientation as it has 3 microphones in approximately a horizontal plane (when the device is operated in portrait orientation) that optimizes capture of directions in a horizontal plane which is important for spatial audio. The microphones are for the same reasons above located away from the device bottom where users typically hold the device when using it in portrait orientation.

As indicated before audio direction detection is often based on analysing differences between microphone signals. The capture device itself may disturb this analysis because the microphones are no longer in free-field conditions. Often optimal location for the microphones for direction detection is to be near edges where they are closer to free-field conditions than in the middle of a facet. In particular, if microphones in a pair are further away from an edge than is their distance from each other then there may be problems in performing direction analysis.

Rotating camera product concepts have been introduced by several manufacturers which reduces the number of cameras needed in a mobile device. For example, the requirement for a selfie camera would become redundant as well as large field-of-view cameras to some extent.

When a capture device captures both (spatial) audio signals and video or image data, these need to be aligned or to match. Where sound source directions in the audio signal do not match a corresponding visual object direction in the image or video data, the resulting playback of video and audio signals will be incorrect and may produce the effect of looking at a subject talking form a first direction but hearing their voice from a second difference direction creating a perceptual error which may make the user disorientated or dizzy. In a device where the camera may rotate the captured audio signals need to be modified to keep the alignment or match between audio and video object directions. In addition, mobile devices may be used in many orientations (landscape, portrait, on a table etc.) and therefore the audio alignment has to take many differing inputs into consideration.

For example if the device has only 3 microphones that do not rotate with the camera, the problem is that not all use cases can be served optimally regardless of the microphone locations.

Furthermore if the device has 4 microphones, then there may be a good location configuration for microphones so that all use cases can be served but the microphones may be positioned such that the user may easily cover them with their hands or the microphones may be located in places where detecting some directions is difficult.

In configurations with 5 microphones, then there may be configurations or designs where the microphone locations are not easily covered by the user's hands and most if not all directions can be detected with suitable accuracy.

One proposal as explored in further detail within the embodiments described herein is to place all of the microphones on the rotating camera part. However the rotating camera part is typically small and placing all of the microphones on this part although would enable the alignment between microphone audio signals and thus the spatial audio signals and the images captured by the camera would solve the audio rotation issue above. However the design of locating the camera and microphones on the rotating part causes the microphones to be generally too close and therefore the audio signals from the microphones are highly correlated. Highly correlated audio signals produce a poorer result for several reasons but particularly beamforming at lower frequencies or for direction analysis at low frequencies.

The concepts which are described with respect to the following embodiments include:

specific microphone locations for a device with a rotating camera;

analyzing audio directions differently in different camera rotations;

analyzing audio directions similarly for low frequencies independent of camera rotation and analyzing directions for high frequencies differently depending on camera rotation; and creating spatial and non-spatial audio depending on camera rotation and device orientation.

Additionally a rotating camera part with some microphones located on it can make direction analysis difficult when microphones move with respect to each other.

Additionally microphones have sound ports to allow the acoustic waves to pass to the microphones and furthermore require a hole or aperture in a device cover to prevent a significant attenuation of the acoustic waves by the cover.

These holes in the cover are problematic as the current trend of making edge-to-edge displays leaves little space for holes. Additionally a user's hands can cover these holes or create handling noise issues as hands move over the holes. Holes are furthermore in some situations deemed aesthetically problematic and cause designers to locate them where they less apparent but typically acoustically problematic, such as next to a camera which may have noisy moving parts.

The concept as discussed herein in the embodiments is a capture device with microphones and rotating camera which can be configured to implement spatial audio capture and alignment with the camera images in such a manner that the user watching and listening is provided with a quality audio signal which is perceptually in alignment with any video images and additionally is able to suitably place holes or ports.

A first example capture device is shown in FIG. 2. The capture device in this example is a mobile device with 4 microphones located within the device body main part and a camera located in a rotating camera part axially rotatable from the main part. The device configuration as shown in FIG. 2 having the microphones located in the main part is therefore configured not to rotate with the camera. The mobile device is configured to receive acoustic waves from substantially all directions using the microphones to generate audio signals and from these microphone audio signals create a rotated spatial audio signal where sound object directions match or are aligned with corresponding video object directions (from the camera) regardless of the device orientation and camera part orientation. In some embodiments audio direction detection is implemented based on the direction or orientation of the camera part because the camera part rotation affects microphone signal delays and levels.

The Focusing can be done using beamforming or spatial filtering where audio directions are analysed, and audio is amplified/attenuated based on analysed directions. These three microphones make it possible to analyse audio directions in a plane but since the device can be used both in portrait and landscape orientations, we need directional analysis also in a direction perpendicular to that plane. Thus 4 microphones in total are needed.

FIG. 2 therefore shows as an example of such a configuration. A mobile device 200 which comprises a body on which the components can be mounted or located. The body can be divided into a main part 210 and camera part 220. The main part 210 and camera part 220 are able to be rotate about an axis (show as dashed line 240). The mobile device 200 shown on the left hand side of the figure shows when the camera part 220 is rotated 90 degrees from alignment with the main part 210 and on the right hand side of the figure shows the camera part 220 aligned with the main part 210 such that when in alignment the camera part and the main part appear substantially a single object.

In the examples shown in FIG. 2 the microphones are located on the main part 210. This makes manufacturing the device easier because the microphones are in the same part where the device processor and motherboard are and thus wirings or other connections are shorter and less complex (and do not have to negotiate the rotating axis).

In FIG. 2 is shown a first microphone, microphone 1, 218 located at the top centre of the main part 210 on a first face of the body of the mobile device. In the examples shown herein a face (of the body) of the mobile device is a side with larger dimensions such as height and width or larger area as compared to one of the edges of the body of the mobile device which is the side with a narrow dimension such as thickness or smaller area.

A second microphone, microphone 2, 212 is located at the bottom centre of the main part 210 on the first face of the body of the mobile device. In other words the first and second microphones are separated by the length (the longest dimension) of the main part of the mobile device.

A third microphone, microphone 3, 214 is located at the top centre of the main part 210 on a second face of the body of the mobile device, where the second face is the opposite side to the first face. The first and the third microphones are separated by the thickness of the mobile device.

A fourth microphone, microphone 4, 216 is located at the top left of the main part 210 on the first face of the bode of the mobile device. The first and fourth microphones are separated by half the width (the remaining dimension) of the main part of the mobile device.

Additionally is shown the rotating camera part 220 comprising a camera 205 located on a face of the rotating camera part such that when the rotating camera part 220 is aligned with the main part 210 the camera 205 and the first, second and fourth microphone are on the same 'face'. However in some embodiments the camera 205 can be located on the edge of the mobile device, or any other suitable location on the rotating camera part.

The first microphone 218, second microphone 212 and third microphone 214 are located such that they can be used to capture spatial audio when the device is operated in landscape mode when spatial audio horizontal directions are enough, and the first microphone 218, second microphone 212, third microphone 214 and fourth microphone 216 used if elevation directionality is required.

When the device is used in portrait mode the first microphone 218, third microphone 214 and fourth microphone 216 can be employed to capture spatial audio.

As the rotating camera part is close to the first microphone 218, fourth microphone 216 and third microphone 214 and the changing device shape may affect audio direction detection and beamforming the device may take the camera part orientation or direction into account and analyse directions differently and use different beams depending on the camera part orientation.

For example as in the configuration in FIG. 2 the second microphone 212 is located further away from the camera part compared to the first microphone 218, fourth microphone 216 and third microphone 214 any analysis that uses only second microphone 212 or uses the second microphone 212 in a pair with another microphone may implement an analysis in a same way for all camera directions (in other words is not affected or modified by the orientation of the camera part). In addition, as low frequencies are less disturbed by small rotating parts such as cameras any analysis may be implemented with no modification for all camera part orientations in low frequencies even if higher frequencies have modifications to processing based on the camera part orientations.

Direction analysis is typically done by finding the delay that gives maximum correlation between microphones. That delay is the Time Difference of Arrival (TDOA) and known methods (e.g. multilateration, and the methods as discussed in WO2018/060549, US20130044884) are used to get the directions. As the microphones are not in a free-field environment and the device obstructs sound (and thus create audio shadows), the determined directions may need to be modified based on the device obstruction. The modification typically is a (look-up) table where an input is a determined or calculated direction and the output is a final output directions. The table is usually created by testing the device by playing sounds from different directions, calculating the estimated directions and then comparing two actual and estimated directions and putting the comparison result into the table. There may be a single table for directions at low frequencies but there may be different tables for directions at high frequencies each table representing different camera rotation. Also, the number of tables may depend on the microphones used in the directional determination. Thus for example when the microphones are located far away from each other or far away from the rotating camera part there may be fewer tables than for microphones that are close to each other and/or close to the rotating part.

For example with respect to FIG. 3 is shown a suitable spatial audio signal generation system according to some embodiments.

The system shows the input microphone audio signals 300 being passed to an audio direction analyser 301.

The system may comprise an audio direction analyser 301 configured to receive the input microphone audio signals 300 and determine audio directions based on any suitable direction determination. The directions 302 can then be passed to the audio directions modifier 303.

The system may comprise an audio directions modifier 303. The audio directions modifier 303 may be configured to receive the directions from the audio direction analyser 301 and furthermore receive a camera rotation input 304 which provides a rotation parameter of the camera part relative to the main part of the body of the device. The audio directions modifier 303 as discussed above may use a series of look-up tables or any other suitable method to modify directions (for various frequency bands) based on the rotation parameter. Modification of the audio directions can be implemented in any suitable manner. For example using a parametric audio system such as the methods as discussed in WO2018/060549, US20130044884, DirAC (Directional Audio Coding) the audio directions may simply be rotated. With ambisonics the ambisonics signal may be rotated using ambisonics rotation matrices The modified direction values 306 may then be passed to the spatial audio generator 305.

The system may comprise a spatial audio generator 305. The spatial audio generator 305 is configured to receive the modified directions 306 and furthermore the input microphone audio signals 300. The spatial audio generator 305 is configured to generate suitable (transport) audio signals and furthermore metadata comprising the modified directions 306 and pass the audio stream 308 to the multiplexer 307.

The system may comprise a multiplexer 307. The multiplexer 307 is configured to receive the video input 310 from the camera and the audio stream 308 and multiplex these to form the output stream 312.

A flow diagram showing the operations of the system shown in FIG. 3 is further shown in FIG. 4.

Thus an operation performed by the system is obtaining audio signals from a microphone array as shown in FIG. 4 by step 401.

A further operation is one of obtaining camera part rotation parameters as shown in FIG. 4 by step 403.

Additionally a further operation is obtaining video signals from a camera as shown in FIG. 4 by step 400.

Having received the audio signals then a further operation is analyzing audio signals to determine directions as shown in FIG. 4 by step 405.

Having determined the directions and obtained the camera part orientation then the directions can be modified based on the camera part orientation parameters as shown in FIG. 4 by step 407.

Then the spatial audio signals can be generated based on the modified directions and the audio signals from the microphones as shown in FIG. 4 by step 409.

Having generated the spatial audio signals these can then be multiplexed with the video signals as shown in FIG. 4 by step 411.

Then the multiplexed signals can be output, to be stored and/or transmitted as shown in FIG. 4 by step 413.

In some embodiments the mobile device can be equipped with 3 microphones and a rotating camera part. As in the embodiments described above the microphones do not rotate with the camera part.

Thus if the number of desired audio use cases is reduced, then the device may have less than 4 microphones.

In FIG. 5 there are shown two further configurations are shown. Thus for example on the left hand side is shown a mobile device 501 where the camera 505 is located in the camera part 515.

Furthermore the example apparatus 501 comprises a first microphone, microphone 1, 516 located at the top left of the main part 512 on a first face of the body of the mobile device. A second microphone, microphone 2, 518 is located at the top right of the main part 512 on the first face of the body of the mobile device. In other words the first and second microphones are separated by the width of the main part of the mobile device.

A third microphone, microphone 3, 514 is located at the top centre of the main part 512 on a second face of the body of the mobile device, where the second face is the opposite side to the first face.

This configuration may be optimized for device operation in portrait mode. This configuration can focus to all camera directions and create spatial audio in portrait orientation but since there is no left-right separation between the microphones in landscape the device 501 can only produce non-spatial audio for landscape videos even if the audio is focused using beamforming etc On the right hand side of FIG. 5 is shown a second mobile device 503 where the camera 505 is located in the camera part 515 and the microphones are located in the main part 512.

The device specifically comprises a first microphone, microphone 1, 528 located at the top centre of the main part 512 on a first face of the body of the mobile device. A second microphone, microphone 2, 522 is located at the bottom centre of the main part 512 on the first face of the body of the mobile device. In other words the first and second microphones are separated by the length of the main part 512 of the mobile device.

A third microphone, microphone 3, 524 is located at the top centre of the main part 512 on a second face of the body of the mobile device, where the second face is the opposite side to the first face. The first and the third microphones are therefore separated by the thickness of the device.

The device shown in this configuration may therefore be effective for landscape operations. This device 503 can produce spatial audio in landscape but can only create spatial audio signals in some camera directions in portrait. The device 503 can focus to any direction on a horizontal plane (in landscape) but this is of little avail because the camera rotates on a vertical plane. Therefore, for only two camera rotation directions can the device 503 create audio focused to the camera direction.

These devices 501 and 503 can be employed for many uses. For device 501 non-spatial audio (typically mono audio) can be adequate for landscape videos if the device main use is for teleconferencing and for device 503 being able to focus to only two camera directions may be enough when those directions are those of a typical phone main camera and selfie camera directions.

Spatial audio can be created using known methods. For example, 3 microphones can be used to create spatial audio (binaural, stereo, 5.1 etc) using methods in WO2018/060549. This type of parametric spatial audio can be rotated by modifying the direction parameter alpha. Also, known methods can be used to create Ambisonics audio. Ambisonics audio can be rotated by multiplying the multichannel (typically 4 channels in first order Ambisonics) signal with rotation matrices.

The first device 501 orientation (portrait or landscape) device microphones capture spatial audio that is rotated to match camera view direction and rotated spatial audio and camera images can be combined to create a video and the second device 503 orientation (landscape or portrait) microphones capture non-spatial audio and non-spatial audio and camera images are combined to create a video. In some embodiments audio direction detection is done differently in different camera directions because camera part rotation affects microphone signal delays and levels.

In some embodiments the mobile device can be equipped with more than 3 microphones and a rotating camera part. As in the embodiments described above the microphones do not rotate with the camera part. For example, FIG. 6 shows an example device which has 5 microphones. This mobile device 601 comprises 5 microphones and a rotating camera. The mobile device 601 is configured to detect audio directions from substantially all directions using microphone signals and creates rotated spatial audio signal where sound object directions in audio match corresponding video objects directions in video regardless of the device orientation and camera direction.

The microphone locations are such that there are at least 4 microphones in areas that users don't typically touch and microphones are not far from device edges in both landscape and portrait orientations. Thus for example the device specifically comprises a first microphone, microphone 1, 624 located at the top right of the main part 612 on a first face of the body of the mobile device. A second microphone, microphone 2, 618 is located at the bottom centre of the main part 612 on the first face of the body of the mobile device. A third microphone, microphone 3, 626 is located at the top right of the main part 612 on a second face of the body of the mobile device, where the second face is the opposite side to the first face. The first and the third microphones are therefore separated by the thickness of the device. A fourth microphone, microphone 4, 614 is located at the bottom centre of the main part 612 on a second face of the body of the mobile device. The second and the fourth microphones are therefore separated by the thickness of the device. A fifth microphone, microphone 5, 616 is located at the top centre of the main part 612 on the first face of the body of the mobile device. The first and the fifth microphones are therefore separated by half the width of the device.

In some embodiments audio direction detection is implemented differently in different camera directions because camera part rotation affects microphone signal delays and levels.

In the example device as shown in FIG. 6 microphones 1, 3, and 5 are approximately on the same plane as the camera rotation and are thus good for focusing audio to any direction where the camera can be rotated. Microphones 2, 4, and 5 are approximately on a horizontal plane when the device is in landscape orientation and are therefore good for capturing spatial audio in landscape orientation. In this configuration it is only microphone 5 which is not near a device edge when camera is in default position but this is less of a problem because microphone 5 is most important for capturing spatial audio when the device is employed in a landscape orientation and the other microphones for this (microphones 2, 4) are located relatively far from microphone 5 and therefore a pairwise comparison of microphone signals produces good directional sensitivity. Furthermore this configuration enables elevation directions to be determined when the device is in an landscape orientation employing microphone 1 in addition to microphones 2, 4, and 5. Although the location of microphone 5 is not near a device edge and thus the elevation sensitivity (when compared pairwise to microphone 1) is not as good as a configuration where the microphone is located at the edge (and has a greater separation) this is not as significant as human beings are less sensitive to accuracy of directions in elevation.

In some embodiments at least two of the microphones are located on the rotatable camera part. For example in some embodiments the mobile device has at least 3 microphones that are positioned so that they are significantly in a plane with respect to the camera regardless of camera part rotation. The mobile device thus is able to capture or record spatial audio with microphones from both parts in one orientation and focused audio with microphones in the camera part in another orientation.

For example as shown in FIG. 7, in some embodiments, three microphones (or more) are placed into a device with a rotating camera so that the microphones form a plane with the camera. In such embodiments two of the microphones rotate with the camera so that the plane always stays aligned with the camera direction. The three microphone signals are then used to create spatial audio using a suitable method.

For example the device, as shown in FIG. 7 comprises a first microphone, microphone 1, 716 located at the end of the rotating camera part 715 of the body of the mobile device. A second microphone, microphone 2, 718 is located at the opposite end of the rotating camera part 715 of the body of the mobile device. A third microphone, microphone 3, 714 is located at the bottom centre of the main part 712 on a first face of the body of the mobile device. The first and the second microphones are therefore separated by the width of the device. The first and the third and the second and the third are separated within one dimension by approximately the length of the device and in a perpendicular dimension by approximately half the width of the device.

The generation of the spatial audio signals from the audio signals can be performed for example based on the methods as described in US20130044884. The analysis for directions described in US20130044884 can remain fixed in all camera rotations because the plane of microphones rotates with the camera.

In some embodiments, audio can be focused to a direction that is dependent on the camera directions. Typically, if the camera is zoomed then audio would be focused towards camera view direction. Focusing can be done using a suitable beamforming operation. In such an operation microphones from the camera part are only used for beamforming because the beamforming direction is dependent on the microphone configuration and microphones located in the rotating camera part stay in the same configuration with respect to the camera.

In some embodiments where the camera is located or housed in the rotating camera part of the mobile device the camera part is significantly smaller than the rest of the device. The mobile device comprises at least 3 microphones, at least two microphones located in camera part and at least one camera located in the main part. In these embodiments the mobile device can be configured to use at least one microphone from the camera part and at least one microphone from the rest part to analyse audio directions for low frequencies and at least two microphones from the camera part to analyse audio directions for high frequencies. The analysed directions and microphone signals can then be used to create spatial audio signals. In some embodiments the mobile device may use the rotating camera part microphones in order to focus audio to at least one direction where the direction is dependent on the camera part rotation.

In some embodiments there may be configurations other than shown in FIG. 7, but there are always at least 2 microphones located in the camera part and at least 1 microphone in the main part. When audio directions are analysed based on phase or level differences between microphone signals the performance is better for the lower frequencies when using the bigger distance between microphones, for example the distance between one camera part microphone and one main part microphone when the main part microphone is located at the bottom of the mobile device because then the level and phase differences are bigger. Also, at lower frequencies the camera part is relatively smaller when compared to the wavelength of audio than at high frequencies and furthermore even when the camera part is rotated this rotation has less effect on the analysis as much as for the higher frequency analysis.

The analysis can in some embodiments be rotation independent in some embodiments. In some embodiments the analysis may differ for some camera rotations but only a small number or few different analyses are needed to obtain the values needed for rotation compensation.

For higher frequencies the rotating camera part is likely to disturb the analysis when done in different rotations when both camera part microphones and main part microphones are used because the wavelength of the audio is closer to the dimensions of the camera part. Therefore, for higher frequencies a directional analysis should be implemented using only camera part microphone audio signals. In such embodiments there may be an additional benefit in that since the camera part rotates both the camera and the microphones the analysis can be the same for all camera rotations when we are interested in audio directions with respect to the camera as is usually the case.

The analysed directions and microphone signals can then be used to create a spatial audio signal as in US20130044884.

In some embodiments the mobile device is configured to analyse audio directions for some camera rotations using microphones from both parts and for other camera rotations using microphones only from the camera part. These analysed directions together with microphone signals are used to create spatial audio.

As the rotating camera part changes the way sound travels around the device when the camera part is rotated it would be expected that audio direction analysis is dependent on the camera rotation. As indicated this may require a large number of different analysis for many directions. In some embodiments the analysis is thus performed differently for only a number of fixed camera rotations, for example 0, 90, 180, and 270 degrees that are most commonly used for example for selfies, landscape videos etc. Microphones from both the rotating camera part and the main part are used for analysing audio directions in these fixed camera rotations for best accuracy in all frequencies. The same analysis may be used around these fixed directions so that for example the analysis that is used for 0 degrees is also used for rotations around 0 degrees i.e. from −20 to 20 degrees rotations. Outside the fixed rotations and their neighbourhood, the device switches to using only rotating camera part microphones for direction analysis. This is because those microphones rotate with the camera and a single analysis can be used for all camera directions.

In some embodiments two or more microphones in the camera part are used for audio focusing (typically beamforming) and spatial audio is created using both the main and rotating part microphones or only the main part microphones. Spatial audio and focused audio are combined to create an audio signal that is spatial but that emphasizes the focused direction.

In some embodiments the audio can be focused to a direction using any suitable method. For example in some embodiments the focusing is implemented by beamforming. Beamforming (and most if not all of the other known focusing methods) requires that microphone locations are known and the locations with respect of the camera are known if the focus direction is desired to be relative to the camera direction. Therefore in some embodiments beamforming can be implemented using camera part microphones only since they rotate with the camera and their locations are thus fixed relative to the camera and each other.

Spatial audio typically requires some separation between microphones so that the microphone signals contain the natural decorrelation of the acoustic space where the recording is done. This is, in particular, true for a mobile device that uses an omnidirectional microphone. (Omnidirectional microphones are used because they are cheaper and more resilient to wind noise than directional microphones.)

In some embodiments a mobile device comprising a rotating camera part and main part may be configured such that an effective microphone location changes as the camera rotates because the sound port of the microphone is revealed under the rotating camera part. This enables the same microphone to be used in different use cases to create spatial audio where use cases require different microphone locations.

As microphones are typically located inside the mobile device, there is a sound port which is configured to connect the microphone to the outside the device so that sounds from outside the device can reach the microphone. For spatial audio capture an important characteristic of the microphone is how the microphone reacts differently for sounds from different directions. The sound port and the sound port hole (the interface between the sound port and the exterior of the mobile device) in the cover of the device is important because outside the port sounds from different directions travel different paths but inside the sound port all sounds travel the same path. Therefore, sound port locations define the microphone effective location for spatial audio capture.

An example of this may be shown in FIG. 8. FIG. 8 for example shows an example mobile device 801 with a rotating camera part 807 and a main part 803. The rotating camera part 807 comprises a camera 805 located at the end of the rotating camera part 807. Additionally is shown two microphones located within the main part. A first microphone, mic2, 815 is located in the main part with a sound port 807 which exits the mobile device main part on one of the faces. This is representative of a normal microphone with a sound port which has the same effective location for all camera part rotations. Thus the effective location of the microphone is constant and independent of the rotation of the rotating camera part 807.

Additionally is shown a further microphone, mic 1, 817. The further microphone is coupled to a sound port which is shown as a port 827 which has a first exit at a first location 821 at the face of the main body when the rotating camera part is closed and a second location 819 over the microphone on the top surface of the main part 803. This second location 819 is blocked when the rotating camera part is in closed position (or in an aligned angle) with respect to the main part (in other words when both parts are aligned with each other) and is open when the rotating camera part is in an open or non-aligned angle (when one part is not aligned with the other). This causes the effective location of the microphone to change as the second location 819 is exposed.

Thus, for example, when the rotating camera part is closed the microphones 1 and 2 effective locations 821 and 807 are respectively to the left and right from the camera axis and the microphones can be used to capture stereo audio. The rotating camera part may be closed in two possible camera directions. If the camera is pointing "right" (top-right in the figure) then mic 1 817 is to the right from the axis and mic 2 815 is to the left and they came be used to capture left and right audio signals. When the camera is pointing "left" (bottom-left in the figure) then mic 1 817 is to the left and mic 2 815 is to the right of the camera axis and they can be used to capture left and right audio signals.

When the camera part is open as shown in FIG. 8, then the effective location 819 of mic 1 817 is changed and now mic 1 817 is the left microphone and mic 2 815 is the right microphone. Both microphones are to the right of the camera axis but this small sideways shift is not significant for stereo audio capture as long as there is a left/right separation with respect to the camera axis between the microphones. Again, if the camera points 180 degrees to the opposite direction compared to FIG. 8, then mic 2 815 becomes the left microphone and mic 1 817 becomes the right microphone.

When there are at least 3 microphones, spatial audio can be created using known methods such as presented in WO2018/060549, US20130044884. The changing effective microphone locations is taken into account by changing the direction calculation according to the current effective microphone locations.

In some embodiments the effective microphone location changes when the camera rotates because the sound port of the microphone is revealed under the rotating camera part. The effective location changes gradually as the camera part moves. This enables the same microphone to be used in different use cases to create spatial audio where use cases require different microphone locations.

These embodiments are similar to those described above but in these embodiments the microphone effective location changes gradually and can be configured to be defined for a range of camera rotations.

For example FIG. 9 shows a mobile device 901 with a rotating camera part 907 and a main part 903. The rotating camera part 907 comprises a camera 905 located at the end of the rotating camera part 807. Additionally is shown a microphone located within the main part, mic1, 917 with a sound port 921 which is formed as an open slot or groove within the main part. The open slot or groove has one end at the microphone 917 and another end at one of the faces of the main part. This open slot or groove is such that as the rotating camera part rotates from a closed or aligned angle with respect to the main part (when both parts are aligned with each other) to an open or non-aligned angle (when one part is not aligned with the other) then the effective location of the microphone changes as a different part of the groove is exposed. Thus the effective location of the microphone is a first location at the face of the main body when the rotating camera part closed and a second location over the microphone and at the opposite end of the open slot when the rotating camera part is open. The slot may be any suitable shape, for example curved or straight.

The example as shown in FIG. 9 shows a single microphone and its groove, but typically devices would have at least two microphones and their grooves.

For example as shown in FIG. 10, a plan view of an example mobile device is shown where the rotating camera part 1005, shown by the dashed outline, is at various angles with respect to the main part 1003, shown by the solid outline. In this example there is shown on the rotating camera part 1005 the camera 1999. Additionally in the main part 1003 is located a first microphone 1006 with a first groove 1008 which extends to a first face of the mobile device. Furthermore is shown a second microphone 1002 with a second groove 1009 which extends to a second face of the mobile device.

As shown in FIG. 10, top left 1001, when the mobile device rotating camera part 1005 is closed the camera has a first orientation, the first microphone 1006 has an effective location 1007 at the first face of the mobile device, and the second microphone 1002 with an effective location 1003 at the second face of the mobile device as the grooves are completely covered. In this configuration the microphones are thus able to capture left audio using the second microphone 1002 and right audio using the first microphone 1006.

Opening the rotating camera part 1005, as shown in FIG. 10, top middle 1011, the camera has a second orientation, the first microphone 1006 has an effective location 1017, and the second microphone 1002 with an effective location 1013 as the grooves are partially exposed. In this configuration the microphones are thus able to capture left audio using the second microphone 1002 effective location 1013 and right audio using the first microphone 1006 effective location 1017.

Rotating further the rotating camera part 1005, as shown in FIG. 10, top right 1021, the camera has a third orientation, the first microphone 1006 has an effective location 1027, and the second microphone 1002 with an effective location 1023 as the grooves are further exposed. In this configuration the microphones are thus able to capture left audio using the second microphone 1002 effective location 1023 and right audio using the first microphone 1006 effective location 1027.

At a further rotation the rotating camera part 1005, as shown in FIG. 10, bottom left 1031, has a fourth orientation, the first microphone 1006 has an effective location 1037 which shows that almost the length of the groove is exposed, and the second microphone 1002 with an effective location 1033 which is almost the length of its groove exposed. In this configuration the microphones are thus able to capture left audio using the second microphone 1002 effective location 1033 and right audio using the first microphone 1006 effective location 1037.

Finally in FIG. 10 is shown when the rotating camera part is rotated to be perpendicular to the main part as shown by the bottom right 1041. The camera has a fifth orientation, the first microphone 1006 has an effective location at 1027 which is the location of the microphone, and the second microphone 1002 with an effective location 1043 which is the location of the microphone as the grooves are fully exposed back to the location of the microphones. In this configuration the microphones are thus able to capture left audio using the second microphone 1002 effective location 1023 and right audio using the first microphone 1006 effective location 1027.

In other words as shown in FIG. 10 the microphones can always be used to capture stereo audio that fits the camera view because the microphone effective locations are always to the left and right of the camera axis.

Furthermore in some embodiments instead of changing the effective locations of microphones the rotating camera part may reveal (when opened) microphones that were hidden under the camera part. These microphones may then be used in use cases where the rotating camera part is open.

More than two microphones may be used, and more than one microphone effective location may be changed when camera part rotates. Different effective locations may make possible different audio capture. For example, 3 microphones may be used to capture spatial audio as described in WO2018/060549.

In some embodiments the switched position and the groove position embodiments may be combined so that some microphones are revealed when camera rotates and other microphone effective locations are changed. Some microphones may therefore have new effective locations and revealed microphones may be used together to create spatial audio or focus audio to a direction using beamforming.

In some embodiments the mobile device may furthermore be able to control the processing of the audio signals based on the camera rotation based on the above sound port examples.

Thus for example there may comprise a microphone signal input 1100 and camera rotation input 1104 which is received by camera rotation effect (on microphones) determiner 1101. The camera rotation effect determiner 1101 may be configured to determine which microphones are available and not covered by the camera and pass these audio signals 1102 to the audio algorithm modifier (for current effective location and microphones) 1103.

The audio algorithm modifier 1103 having received the processed audio signals 1102 can then modify the algorithm to calculate directions so that they match the camera direction and output a processed audio signal to the spatial audio generator 1105.

The spatial audio generator 1105 is then configured to generate spatial audio signals 1108 based on the audio signals from the microphones and based on the directions and pass these to a multiplexer 1107. In some embodiments the spatial audio generator 1105 is configured to select microphone signals (depending on camera direction) to use with the directions.

The multiplexer 1107 may be configured to receive the spatial audio signals 1108 and the video input 1110 and multiplex the two to generate the output data stream 1112.

The operation of the system shown in FIG. 11 is shown in the flow diagram in FIG. 12.

Thus an operation performed by the system is obtaining audio signals from a microphone array as shown in FIG. 12 by step 1201.

A further operation is one of obtaining camera part rotation parameters as shown in FIG. 12 by step 1203.

Additionally a further operation is obtaining video signals from a camera as shown in FIG. 12 by step 1200.

Having received the audio signals then a further operation is that of determining for current camera rotation parameters which microphones are revealed and/or affected (in other words covered or partially covered) as shown in FIG. 12 by step 1205.

Having determined which microphones are revealed and/or covered then the audio algorithm is modified for the current effective location and microphones as shown in FIG. 12 by step 1207.

Then the spatial audio signals can be generated based on the modified algorithms and the audio signals from the microphones as shown in FIG. 12 by step 1209.

Having generated the spatial audio signals these can then be multiplexed with the video signals as shown in FIG. 12 by step 1211.

Then the multiplexed signals can be output, to be stored and/or transmitted as shown in FIG. 12 by step 1213.

In the examples above the apparatus comprising the first part, the part with a camera, and the second part, the part with at least one microphone are configured to rotate or move relative to a common axis (which may for example be equipped to pass signals between the parts). In some embodiments the motion of the first part relative to the second part, or vice versa is not about a common axis. For example the motion can be any translation and/or rotation. For example the camera part may rise or periscope from the body part and then furthermore be able to rotate or further move relative to the body part. This motion can be considered to be a motion and/or rotation of at least one of the two parts relative to a reference point.

With respect to FIG. 13 an example electronic device which may be used as any of the apparatus parts of the system as described above. The device may be any suitable electronics device or apparatus. For example in some embodiments the device 1700 is a mobile device, user equipment, tablet computer, computer, audio playback apparatus, etc. The device may for example be configured to implement the encoder/analyser part 101 or the decoder/synthesizer part 105 as shown in FIG. 1 or any functional block as described above.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals.

In some embodiments the device 1700 may be employed as at least part of the synthesis device. The input/output port 1709 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
   a first part, the first part having: at least one camera configured to capture images, and at least one microphone configured to capture at least one audio signal;
   a second part having at least one respective microphone configured to capture at least one respective audio signal, wherein one of the first part or the second part is configured to perform a move relative to the other part;
   at least one processor; and
   at least one memory storing instructions that, when executed with the at least one processor, cause the apparatus at least to:
      determine a parameter associated with the move, wherein the parameter is configured to indicate at least one of:
      an angle between the first part and the second part resulting from the move, or
      a distance between the first part and the second part resulting from the move;
      select at least one of:
         the at least one audio signal from the first part, or
         the at least one audio signal from the second part
      based, at least partially, on the determined parameter; and
      generate at least one output audio signal based on the parameter associated with the move and the selected at least one of: the at least one audio signal from the first part, or the at least one audio signal from the second part.

2. The apparatus of claim 1, wherein generating the at least one output audio signal comprises the at least one memory storing instructions that, when executed with the at least one processor, cause the apparatus to:

determine one or more audio directions based on the selected at least one of: the at least one audio signal from the first part, or the at least one audio signal from the second part;

modify the one or more audio directions based on the parameter; and generate the at least one output audio signal based on the one or more modified audio directions.

3. The apparatus of claim 1, wherein the at least one audio signal from the first part and the at least one audio signal from the second part are selected in response to the determined parameter being configured to further indicate an orientation between the first part and the second part resulting from the move.

4. The apparatus of claim 1, wherein the at least one audio signal from the first part is selected in response to the determined parameter comprising a second parameter, wherein the second parameter is configured to indicate an orientation of the at least one camera of the first part relative to the second part.

5. The apparatus of claim 4, wherein generating the at least one output audio signal comprises the at least one memory storing instructions that, when executed with the at least one processor, cause the apparatus to:

beamform the at least one selected audio signal from the first part based, at least partially, on the second parameter to generate at least one focused audio signal; and generate the at least one output audio signal based, at least partially, on the at least one focused audio signal.

6. The apparatus of claim 1, wherein the determined parameter is associated with the at least one microphone of the first part and the at least one microphone of the second part substantially being in a same plane, wherein the at least one audio signal from the first part and the at least one audio signal from the second part are selected in response to the determined parameter.

7. The apparatus of claim 1, wherein the at least one audio signal from the first part and the at least one audio signal from the second part are selected, wherein the at least one generated output audio signal comprises at least one spatial audio signal.

8. The apparatus of claim 1, wherein generating the at least one output audio signal comprises the at least one memory storing instructions that, when executed with the at least one processor, cause the apparatus to:

select a direction analysis method based, at least partially, on the determined parameter;

determine one or more audio directions using the selected direction analysis method; and generate the at least one output audio signal based on the one or more determined audio directions.

9. The apparatus of claim 8, wherein the selected direction analysis method comprises a first direction analysis method in response to the determined parameter, comprising at least an orientation between the first part and the second part resulting from the move, being in at least one predetermined range of orientations, wherein the selected direction analysis method comprises a second direction analysis method in response to the determined parameter, comprising at least the orientation, being outside the at least one predetermined range of orientations, wherein the first direction analysis method is at least partially different from the second direction analysis method.

10. The apparatus of claim 1, wherein the first part or the second part is configured to move relative to a common reference point, wherein the first part and the second part are at least partially physically connected to each other.

11. The apparatus of to claim 1, wherein the move is at least one of:

a rotation about an axis in common between the first part and the second part;

a pitch and/or yaw and/or roll movement between the first part and the second part;

a movement of the first part relative to the second part; or a movement of the second part relative to the first part.

12. The apparatus of claim 1, wherein the at least one microphone of the second part comprises at least three microphones arranged with respect to the second part, wherein generating the at least one output audio signal based on the parameter associated with the move and the selected at least one of: the at least one audio signal of the first part, or the at least one audio signal of the second part comprises the at least one memory storing instructions that, when executed with the at least one processor, cause the apparatus to:

obtain a parameter defining an arrangement of the at least three microphones;

obtain a parameter defining an orientation of the apparatus; and generate the at least one output audio signal further based on the parameter defining the arrangement of the at least three microphones and the parameter defining the orientation of the apparatus.

13. The apparatus of claim 12, wherein generating the at least one output audio signal further based on the parameter defining the arrangement of the at least three microphones and the parameter defining the orientation of the apparatus comprises the at least one memory storing instructions that, when executed with the at least one processor, cause the apparatus to:

generate the at least one output audio signal for at least one frequency band based on the parameter defining the arrangement of the at least three microphones and the parameter defining the orientation of the apparatus.

14. The apparatus of claim 1, wherein the at least one output audio signal comprises at least one of:

at least one spatial audio signal;

at least one non-spatial audio signal;

a mono audio signal;

a beamformed audio signal; or a shotgun audio signal.

15. A method comprising:

providing an apparatus, the apparatus comprising:

a first part, the first part having: at least one camera configured to capture images, and at least one microphone configured to capture at least one audio signal;

a second part having at least one respective microphone configured to capture at least one respective audio signal, wherein one of the first part or the second part is configured to perform a move relative to the other part;

determining a parameter associated with the move, wherein the parameter is configured to indicate at least one of:

an angle between the first part and the second part resulting from the move, or a distance between the first part and the second part resulting from the move;

selecting at least one of:

the at least one audio signal from the first part, or the at least one audio signal from the second part based, at least partially, on the determined parameter; and generating at least one output audio signal based on the parameter associated with the move and the selected at least one of: the at least one audio signal from the first part, or the at least one audio signal from the second part.

16. The method of claim 15, wherein the generating of the at least one output audio signal comprises:

determining one or more audio directions based on the selected at least one of: the at least one audio signal from the first part, or the at least one audio signal from the second part;

modifying the one or more audio directions based on the parameter; and generating the at least one output audio signal based on the one or more modified audio directions.

17. The method of claim 15, wherein the at least one audio signal from the first part and the at least one audio signal from the second part are selected in response to the determined parameter being configured to further indicate an orientation between the first part and the second part resulting from the move.

18. The method of claim 15, wherein the at least one audio signal from the first part is selected in response to the determined parameter comprising a second parameter, wherein the second parameter is configured to indicate an orientation of the at least one camera of the first part relative to the second part.

19. The method of claim 15, wherein the generating of the at least one output audio signal comprises:

selecting a direction analysis method based, at least partially, on the determined parameter;

determining one or more audio directions using the selected direction analysis method; and generating the at least one output audio signal based on the one or more determined audio directions.

20. A non-transitory computer-readable medium comprising instructions stored thereon for performing at least the following:

providing an apparatus, the apparatus comprising:

a first part, the first part having: at least one camera configured to capture images, and at least one microphone configured to capture at least one audio signal;

a second part having at least one respective microphone configured to capture at least one respective audio signal, wherein one of the first part or the second part is configured to perform a move relative to the other part;

determining a parameter associated with the move, wherein the parameter is configured to indicate at least one of:

an angle between the first part and the second part resulting from the move, or a distance between the first part and the second part resulting from the move;

selecting at least one of:

the at least one audio signal from the first part, or the at least one audio signal from the second part based, at least partially, on the determined parameter; and causing generation of at least one output audio signal based on the parameter associated with the move and the selected at least one of: the at least one audio signal from the first part, or the at least one audio signal from the second part.

* * * * *